J. C. BLACK
PROCESS FOR HEATING OILS
July 12, 1932. Original Filed May 9, 1924 Re. 18,517
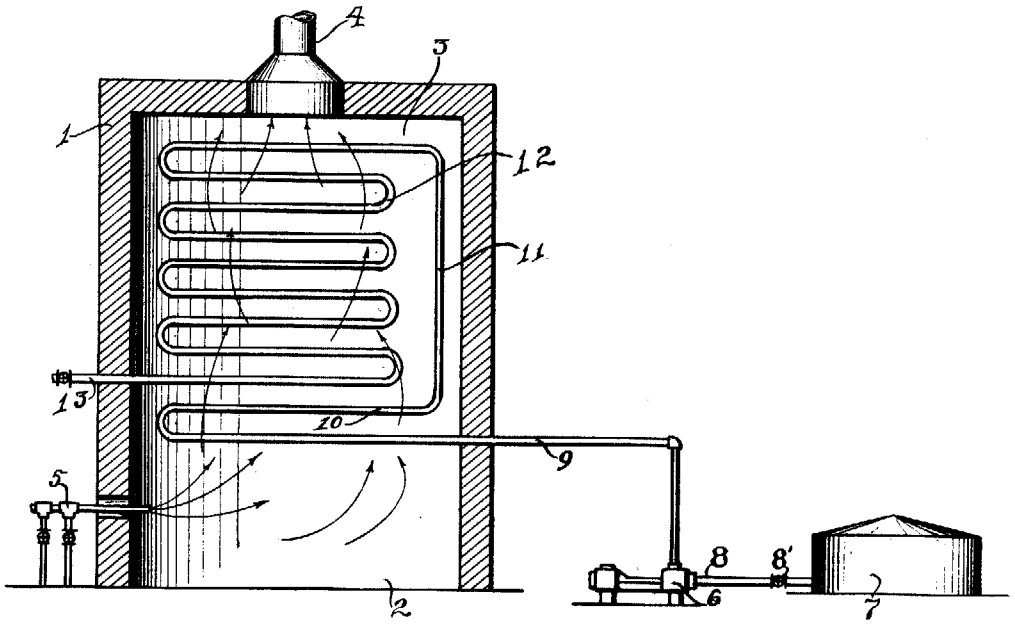
Inventor
John C. Black
By
J. D. Newton
Attorney Reissued July 12, 1932

Re. 18,517

UNITED STATES PATENT OFFICE

JOHN C. BLACK, OF LOS ANGELES, CALIFORNIA, ASSIGNOR, BY MESNE ASSIGNMENTS, TO GASOLINE PRODUCTS COMPANY, INC., OF WILMINGTON, DELAWARE, A CORPORATION OF DELAWARE

PROCESS FOR HEATING OILS

Original No. 1,708,076, dated April 9, 1929, Serial No. 712,156, filed May 9, 1924. Application for reissue filed May 4, 1929. Serial No. 360,573.

This invention relates to a process for heating petroleum oils preparatory to distillation or for cracking purposes or for heating oils for any purpose.

The heater is of tubular construction and the elements may be of series or multiple connection and may be connected to a still or evaporator or in some types of cracking apparatus may be connected to reaction chambers, carbon catchers or evaporators or may be connected to coolers or heat interchangers, the novel features being in the arrangement of the heating elements and will operate equally well on all types of apparatus of which it may be a component part.

The heating element may be made of pipes or tubes and are placed in a furnace designed to supply heat thereto.

In all heat interchange apparatus, it is the usual practice to make the fluids, gases or vapors or combination of them, flow in counter current relation to each other; that is to say the colder material to be heated is first passed in contact with the outgoing heating medium and as the colder material is gradually heated, it comes in contact with increasingly hotter heating medium until finally the outgoing heated material meets the incoming heating medium when the latter is at its highest temperature. In this way, the greatest amount of heat may be absorbed and the efficiency of interchange is a maximum.

Tubular oil heaters are usually constructed on the above principle—the elements being so arranged that the oil passing through the final tubes will be subjected to the hottest gases in the furnace and the entering colder oil will be subjected to the reduced temperature of the exit gases, thereby apparently obtaining the best results and the most efficient operation.

I have found, however, by practical experience that a heating element placed in a furnace constructed on the above principle will have a short life, the tubes carrying the hottest oil in the hottest portion of the furnace will sag and burn out and will require continual renewal of tubes.

The reason for this is that the oil entering the final heating elements will have attained very closely its maximum temperature with the result that there is a reduced heat differential between the oil and the heating medium so that the oil absorbs or carries away only a small amount of heat which permits the pipes or tubes to become highly overheated causing their eventual destruction.

Now I have found that I can overcome this difficulty in a very simple and efficient manner by placing the initial heating elements (carrying the colder oil) in the hottest portion of the furnace where it is subjected to the highest temperature of the heating medium. In this way, the heat differential is at a maximum and a large amount of heat is absorbed by the oil which will maintain the tubes in a comparatively cool condition, thereby prolonging their life and largely prevent the sagging of the pipes and will effectually prevent their destruction by burning out.

The position of the initial coil or element in the furnace is such that it acts as a protector between the extreme heat of the fire or heating medium and the final coil or heating element by interposing a cooling device to the fire or heating medium and functions as such to the extent that the final coils or heating elements will be undamaged by excessive heat.

The arrangement of the coils or heating elements are such that the oil passes first through the initial heating element where it is subjected to the highest temperature of the heating medium; it then passes to the elements in contact with the exit or final heating medium; it then flows in a counter current manner in relation to the heating medium, and eventually emerges at a point where the heating medium is leaving the initial coils or heating elements. In this way, the latter part of the heating operation is done on a counter current principle, the initial coil or element acting as a preliminary or auxiliary coil to the balance of the heating element.

By reference to the drawing and the following description of its operation, the invention may be readily understood.

The drawing shows a diagrammatic elevation of a heating element placed in a furnace and clearly shows the method of construction. I only show a single series of tubes or pipes but these could be multiplied and connected in multiple or series which would be readily understood by anyone familiar with the art to which this invention pertains.

The drawing represents a brick furnace setting 1; 2 is the firebox or combustion chamber; 3 is the exit gas space and 4 is the stack; 5 is the burner for supplying heat to the apparatus; 6 is a pump for circulating the oil through the coils or heating elements; 7 is a tank to hold the oil to be heated; the flow of oil from the tank 7 to the pump 6 is through the pipe 8 and valve 8′; the pump 6 discharges through line 9 to the initial heating coil or element 10, from which it flows through line 11 to the entrance end of the coil or heating element 12 from which it flows toward the hotter portion of the furnace and exits at a point substantially where the heating medium leaves the coil 10; the exit end of the final coil or heating element 12 is shown as 13 and may be connected to any auxiliary apparatus desired, such as a still, evaporator, fractionating tower or, if used for cracking purposes, may be connected to a still, a reaction chamber or carbon catcher, or it may be connected to a heat exchanger or cooler for some classes of refining operations.

The operation of the apparatus is as follows:

The pump 6 is started, drawing its supply of oil to be heated through the line 8 and valve 8′ connected to the oil supply tank 7; the pump discharges the oil through the line 9 into the heating element 10, which I have designated as the initial or primary heating element; this element is connected in series relation with the final or secondary heating element or coil 12, the two being connected by pipe 11; coil 12 has an outlet 13 connected to any subsequent or auxiliary apparatus desired which is immaterial to the operation of the heater; the fires are now started from burner 5; the hot combustion gases in the combustion space 2 will ascend through the coils or heating elements, passing first through the initial or primary coils or element wherein the coolest oil flows; then the partially cooled combustion gases ascend through the final or secondary coils or element wherein the oil flows in a counter current direction to the ascending gases and is progressively heated as it descends through the heating element and cómes in contact with the increasing temperature of the combustion gases; the oil then passes out of the final or secondary coil or element through pipe 13 for further manipulation of treatment.

By this arrangement of heating coils or element, I am able to prolong the life of the coils and to increase the capacity of the apparatus; the coil 10 absorbs the radiant heat of the fire and partially cools the ascending combustion gases as they flow through the coil, so that the gases impinging on the lower portions of the coil 12 are considerably reduced in temperature and will not injure the metal by burning as would be the case if the bottom coils carried the hottest oil, for the reason that their heat absorbing capacity is much reduced as the oil is practically up to its desired final temperature in the terminal passes of the coil.

It is to be understood that this arrangement of coils and furnace could be reversed, the combustion gases entering the coil space at the top and leaving at the bottom, the coil arrangement would then be reversed—the initial or primary coil or element being at the top and the secondary coil or final heating element would be below with its outlet below the initial coil or element.

As an economy, a heat interchanger could be interposed in the pipe 9, either as a preheater in the furnace space 3 or as a vapor or liquid heat interchanger. I have not shown this on the drawing as it complicates it and is not essential to the operation of the apparatus.

What I claim is:

1. A process of heating petroleum oils in tubular coils situated in a furnace which comprises first passing the oil through a section of coil located in the hottest zone of the furnace comprising a plurality of rows of tubes in which the flow of oil through the tubes of each row is substantially transverse to that of the flow of furnace gases and in which the passage of oil from row to row is in substantially the same direction as that of the flow of furnace gases and then passing the oil through a section of coil located in a less highly heated zone of the furnace comprising a plurality of rows of tubes in which the flow of oil through the tubes of each row is substantially transverse of the flow of furnace gases and in which the passage of oil from row to row is substantially counter-current to that of the furnace gases.

2. A process of heating petroleum oils in tubular coils situated in a furnace which comprises first passing the oil through a section of coil located in the hottest zone of the furnace and arranged to absorb radiant heat comprising a plurality of rows of tubes in which the flow of oil from row to row is in substantially the same direction as that of the flow of furnace gases, and then passing the oil through a section of coil located in a less highly heated zone of the furnace comprising a plurality of rows of tubes in which the flow of oil through the tubes of each row is substantially transverse of the flow of furnace gases and in which the passage of oil from row to row is substantially countercurrent to that of the furnace gases.

JOHN C. BLACK.

DISCLAIMER

Re. 18,517.—*John C. Black*, Los Angeles, Calif., PROCESS FOR HEATING OILS. Patent dated July 12, 1932. Disclaimer filed December 19, 1935, by the assignee, *Gasoline Products Company, Inc.*

Hereby enters this disclaimer to claims 1 and 2 of the aforesaid Letters Patent which are in the following words, to wit:

"1. A process of heating petroleum oils in tubular coils situated in a furnace which comprises first passing the oil through a section of coil located in the hottest zone of the furnace comprising a plurality of rows of tubes in which the flow of oil through the tubes of each row is substantially transverse to that of the flow of furnace gases and in which the passage of oil from row to row is in substantially the same direction as that of the flow of furnace gases and then passing the oil through a section of coil located in a less highly heated zone of the furnace comprising a plurality of rows of tubes in which the flow of oil through the tubes of each row is substantially transverse of the flow of furnace gases and in which the passage of oil from row to row is substantially counter-current to that of the furnace gases.

"2. A process of heating petroleum oils in tubular coils situated in a furnace which comprises first passing the oil through a section of coil located in the hottest zone of the furnace and arranged to absorb radiant heat comprising a plurality of rows of tubes in which the flow of oil from row to row is in substantially the same direction as that of the flow of furnace gases, and then passing the oil through a section of coil located in a less highly heated zone of the furnace comprising a plurality of rows of tubes in which the flow of oil through the tubes of each row is substantially transverse of the flow of furnace gases and in which the passage of oil from row to row is substantially counter-current to that of the furnace gases."

[*Official Gazette January 14, 1936.*]